United States Patent [19]

Milford, Jr.

[11] 3,888,821

[45] June 10, 1975

[54] AROMATIC POLYAMIDE FIBERS CONTAINING ULTRAVIOLET LIGHT SCREENERS

[75] Inventor: George Noel Milford, Jr., Waynesboro, Va.

[73] Assignee: E. I. Du Pont De Nemours & Company, Wilmington, Del.

[22] Filed: Nov. 2, 1972

[21] Appl. No.: 303,202

[52] U.S. Cl.... 260/45.8 NT; 161/174; 260/45.95 F; 260/78 R; 260/78 SC; 264/182
[51] Int. Cl. ...................... C08f 45/58; C08g 51/58
[58] Field of Search..... 260/45.95 F, 78 S, 45.8 NT, 260/78 R, 78 SC; 161/174; 264/182

[56] References Cited
UNITED STATES PATENTS

| | | | |
|---|---|---|---|
| 3,004,896 | 10/1961 | Heller et al. | 260/45.8 |
| 3,043,709 | 7/1962 | Amborski | 117/7 |
| 3,049,443 | 8/1962 | Coleman | 117/138.8 |
| 3,094,511 | 6/1963 | Hill, Jr. et al. | 260/78 |
| 3,102,323 | 9/1963 | Adams | 260/40 |
| 3,282,886 | 11/1966 | Gadecki | 260/45.8 |
| 3,320,207 | 5/1967 | Roth et al. | 260/45.95 |
| 3,454,412 | 7/1969 | Stokes | 106/287 |
| 3,493,633 | 2/1970 | Lange | 260/857 |
| 3,641,213 | 2/1972 | Rodgers | 260/895 |
| 3,773,884 | 11/1973 | Shimosaka et al. | 264/182 |

Primary Examiner—Ronald W. Griffin

[57] ABSTRACT

A synthetic aromatic polyamide fiber containing an ultravoilet light screener in a form such that any agglomerate thereof is less than 0.01 micron in diameter is obtained by imbiding a dispersion or solution of the screener into aromatic polyamide fibers that have never been allowed to become dry after being spun.

7 Claims, 6 Drawing Figures

AROMATIC POLYAMIDE FIBERS CONTAINING ULTRAVIOLET LIGHT SCREENERS

FIELD OF THE INVENTION

The present invention concerns aromatic polyamide fibers containing ultraviolet light screeners to protect the fibers from degradation by ultraviolet radiation. More particularly, the invention is directed to synthetic fibers of aromatic polyamides containing ultraviolet light screeners in microdispersed form.

BACKGROUND OF THE INVENTION

Synthetic fibrs of aromatic polyamides are well known in the art. Their superior high temperature performance, e.g., strength retention at elevated temperature, and inherent flammability resistance, has led to commercial use of these fibers, primarily by industry and the military, in such areas as protective garments for fire fighters, jet pilots, foundry employees, etc., flameproof carpeting, draperies, etc., for public buildings; and also for flameproof bed coverings and sleepwear, particularly in hospitals. In spite of the inherently high cost of the aromatic polyamide fibers, further penetration into the industrial and military markets as well as the household furnishings and apparel markets would be expected if the poor ultraviolet light stability characteristic of these aromatic polyamides could be ameliorated.

It is also known in the prior art to protect unstable polymric substrates with certain additives, called ultraviolet light screeners (referred to hereinafter as UV screeners), whose function is to asorb preferentially the deleterious incident wavelengths and then dissipate the energy via harmless mechanisms, e.g., heat florescence, etc.

Regardless of the detailed mechanism of energy absorption and dissipation, highest protection efficiency should be achieved when the UV screener molecules are concentrated preferentially near the surface of the substrate while simultaneously being essentially molecularly dispersed, i.e., such that no substrate polymer molecule (near the surface) is very far removed from at least one protective screener molecule.

For fibrous materials, UV screeners have heretofore been either "spun-in" (i.e., combined with the polymer prior to fiber extrusion), or "dyed-in" (i.e., applied to preformed fibers from solution in a process analogous to dyeing), or even coated on the fiber surface, usually employing a binder resin which forms a screener-containing sheath around the primary fiber. Each of these prior art techniques has certain disadvantages, some of which are particularly severe when used with aromatic polyamide fibers. These disadvantages are listed as follows:

1. The spun-in screener technique obviously requires that the screener be stable under fiber extrusion conditions (which are relatively severe for the aromatic polyamides), and in addition, the presence of screener causes varius filtration, metering-blending, and extraction-contamination problems during the spinning and subsequent fiber processing operations. Even though these operational problems are not insurmountable, it has been discovered that aromatic polyamide fibers with spun-in screener have structural disadvantages in that the screener is found to be concentrated preferentially in the core of the fiber with a concomitant very low or zero concentration of screener near the fiber surface where the UV protection is most required. (This undesirable structure is thought to be a direct consequence of the fact that these aromatic polyamide fibers must be spun from solution — since the polymers cannot be melt-extruded — and that the spun-in screener migrates to the center of the fiber with the residual solvent as polymer precipitation progressively occurs starting first with fiber surface skin formation). An additional structural deficiency is that the screener inside the fiber is distributed in "lumps" approximately 0.04–0.15 micron and larger in diameter in contrast to the desired "molecularly dispersed" distribution. Even worse, when the as-spun fibers containing spun-in screener are subsequently crystallized, the lumps of screener grow even larger in size.

2. The dyed-in screener technique is also unsatisfactory for aromatic polyamide fibers, which the prior art recognizes are characteristically difficult to dye. Even by use of carrier-assisted dyeing techniques, only low, relatively ineffective concentrations of screener have been introduced by this method. Furthermore, such screener as has been dyed-in is again found to be deposited in undesirable lumps of 0.01 micron and larger diameter.

3. The coated-on screener technique, although desirably providing a high concentration of screener at the fiber surface, is subject in general to destruction and removal through abrasion of the fibers in processing and ordinary use. Furthermore, an additional deficiency for the present aromatic polyamide fibers is that the binder resin for the screener can constitute a source of "fuel" partially negating the desirable flameproof character of the aromatic polyamide fibers.

Thus, it would be desirable to provide an aromatic polyamide fiber which contains a UV screener in microdispersed form. Such a UV screener-containing fiber is provided by this invention.

SUMMARY OF THE INVENTION

The present invention proivdes an aromatic polyamide fiber containing an effective amount of an ultraviolet light screener in which the screener is distributed in the fiber in a form such that any agglomerate thereof is less than 0.01 micron in diameter, and in which the screener absorbs electromagnetic radiation in the 340 to 390 millimicron wavelength region.

DESCRIPTION OF THE INVENTION

The fibers of this invention may be prepared, as illustrated in the examples hereinafter, by extruding fibers from suitable solutions of aromatic polyamides employing either a dry- or wet-spinning process, washing the nascent fibers, which contain relatively high levels of residual solvent with water, and exposing the washed never-dried fibers to an aqueous mixture of a UV screener. Heating during the imbibition, preferably at boil, is helpful in obtaining imbibition within a reasonable time interval. Apparently, the water serves to displace the residual solvent, and — so long as the fibers remain wet — they retain a unique microporous structure into which UV screener may be transferred from aqueous dispersions. The subsequently dried fibers contain the screener in microdispersed form. By virtue of their improved structure, these fibers of the present invention have improved resistance to both degradation of tensile properties and discoloration or color break of dyed samples occasioned by exposure to ultraviolet radiation, e.g., sunlight. The fibers therefore have enhanced utility in applications such as carpets, upholstery, and drapes, as well as in consumer apparel, such as children's sleepwear. Furthermore, not only is the micro-dispersed screener in these dried fibers resistant to removal by subsequent scouring or dyeing operations, but the dyeing rates are found to be enhanced and brighter colors are obtained.

Figure 1:
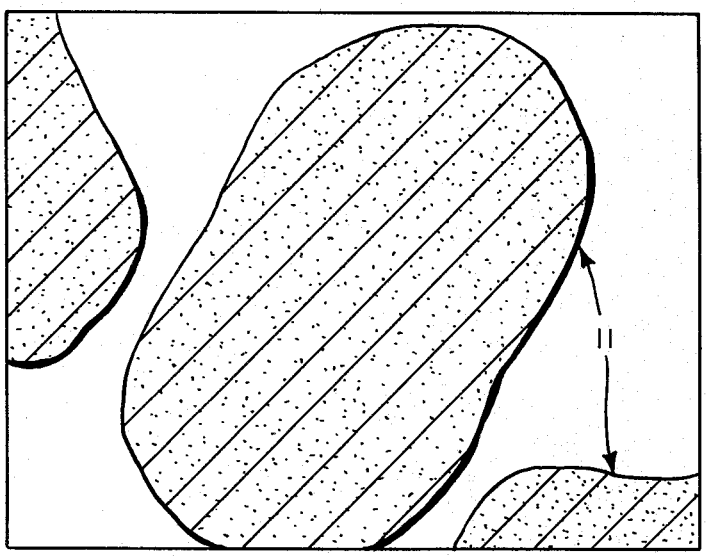
FIG. 1 is a drawing based on an electron micrograph of a cross-section of an aromatic polyamide fiber containing 6% UV screener in a form such that any agglomerate thereof is less than 0.01 micron in diameter.
Figure 2:
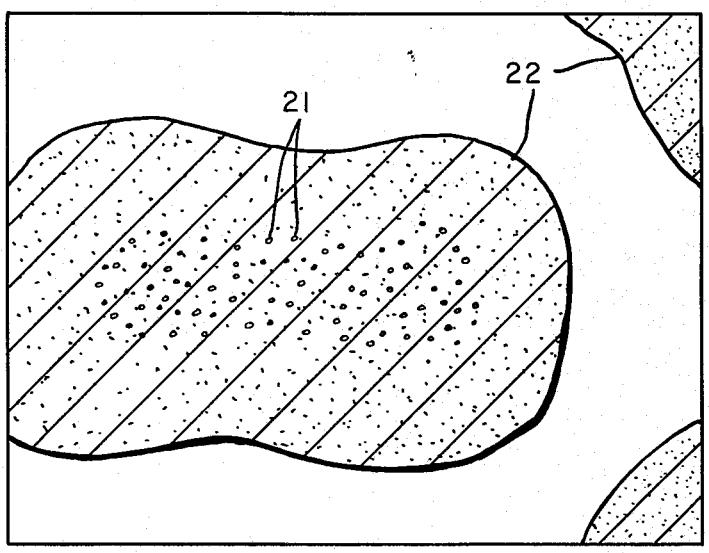
FIG. 2 is a drawing based on an electron micrograph of a cross-section of an aromatic polyamide fiber containing 6% spun-in UV screener.

The improved structure of the fibers of this invention is defined primarily in terms of the microdispersed character of the UV screener distribution in the fiber, which approaches the theoretical ideal of molecularly dispersed screener much more closely than the "lumpy" screener deposits provided by the prior art. This feature may readily be understood by reference to FIGS. 1 and 2, which are drawings based on electron transmission micrographs taken at a magnification of approximately 5,000X os fiber cross-sections. The fibers in both figures are aromatic polyamide fiber containing 6% UV screener. In FIG. 1, the fibers of this invention 11 contain microdispersed screener, i.e., the screener agglomerates are too small to be resolved. (The stippling in the drawings of FIGS. 1 and 2 is employed to indicate only that the fiber cross-sections appear "grayer" than the matrix background in the electron transmission micrograph, and does not denote screener agglomerates of resolvable size, such as those indicated by 21 in FIG. 2). In FIG. 2, the fibers 22 are representative of the prior art spun-in screener structures wherein the screener deposits 21 are readily discerned as individual small lumps of irregular sizes larger than 0.01 micron, and which tend to congregate in the core of the fiber.

Accordingly, for the purposes of the present invention, the term "microdispersed screener" is defined to mean a distribution of UV screener such that any agglomerate of the screener is less than 0.01 micron in diameter, as established by standard electron transmission micrography of fiber cross-sections employing e.g., a Philips EM-300 transmission electron microscope. It is understood that the term agglomerate as used herein includes particles as well as aggregations of particles of the screener. It is believed that the screener exists in the form of very fine individual particles or aggregates thereof. The screener is in a discrete form, i.e., it can be solvent extracted from the fiber and thus is not chemically combined with the polymer of the fiber.

The preferred technique for examining the fiber cross-sections by transmission micrography is to embed a suitable number of single filaments, e.g., several dozen, in gelatin. The fibers may be stretched across a wire frame support which is placed in a two-inch deep dish which is then filled with a 14% aqueous solution of Knox unflavored protein gelatin at 60°C. The dish and contents are cooled in ice for 1 hour and then left overnight at room temperature. The gelatin sets up in about 2 hours. A "wooden matchstick-sized" slab containing the fibers is trimmed from the gelatin block with a razor blade. A convenient length of this slab is then transferred to a freezing microtome, surrounded by a droplet of water, frozen, and cut to produce one-half micron thick cross-sections of the fibers. These cross-sections are then observed by standard electron transmission micrography techniques employing suitable magnification, e.g., up to 20,000X or higher, such that particles 0.01 micron in diameter or larger will be resolved. If essentially no agglomerates of screener at least 0.01 micron in diameter can be found on examining a representative number of fiber cross-sections, e.g., six or more, the screener is in microdispersed form. Of course, where third components are present in the fibers, e.g., delusterant particles, antistat agents, etc., selective extraction or other suitable techniques may be employed to determine whether any particles which may be observed are to be identified as screener or as the third component.

Figure 3:
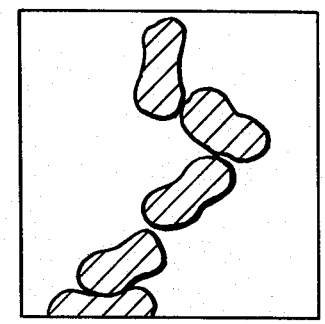
FIG. 3 is a drawing based on a photomicrograph taken with UV illumination of a cross-section of an aromatic polyamide fiber containing no UV screener.
Figure 4:
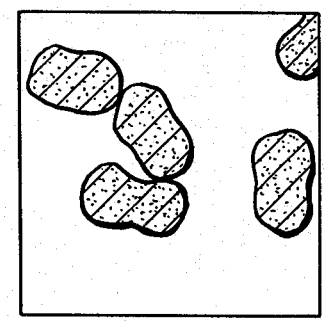
FIG. 4 is a drawing based on a photomicrograph taken with UV illumination of a cross-section of an aromatic polyamide fiber containing 6% UV screener in a form such that any agglomerate thereof is less than 0.01 micron in diameter.
Figure 5:
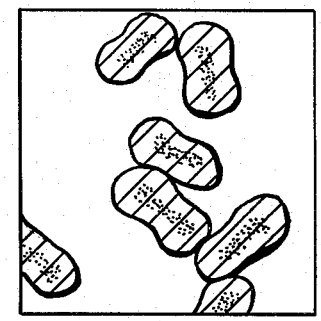
FIG. 5 is a drawing based on a photomicrograph taken with UV illumination of a cross-section of an aromatic polyamide fiber containing 6% spun-in UV screener.

The indication from electron transmission micrographs, as illustrated in FIG. 2, that the UV screener in aromatic polyamide fibers containing spun-in screener occurs not only in lumps, but also is preferentially concentrated (undesirably) in the core of the fiber, appears to be a general phenomenon. This unfavorable distribution of spun-in screener has been confirmed by the following UV microscopy technique. An ordinary microscope with a magnification of about 750 to 1000X is used to study five-micron-thick fiber sections which are brought into focus using visible light illumination. The visible light source is then replaced with an ultraviolet radiation source, which may conveniently be the 365 millimicron emission line from a filtered mercury arc, and a photomicrograph of the sample taken employing, e.g., Polaroid Type 107 film. (Prior to the exposure in ultraviolet light, a slight adjustment in focus, which may be determined by a few trial-and-error exposures, will usually be found desirable since the microscope optics are ordinarily not achromatic.) The wavelength of UV illumination, e.g., 365 millimicrons, is selected deliberately such that the aromatic polyamides are transparent at this wavelength, while the UV screeners, by definition, are strongly absorbing. Accordingly, aromatic polyamide fibers containing no screener yield cross-sections which are essentially "clear" in these UV photomicrographs, as indicated in the drawing of FIG. 3. In contrast, the fibers of this invention containing microdispersed screener provide cross-sections which are "gray" over their entire area (denoted in the Figures by the stippling), with the density of "grayness" depending on screener concentration, cross-section thickness, exposure time, etc., one example being indicated in the drawing of FIG. 4. FIG. 5 is a drawing from UV photomicrographs of cross-sections of aromatic polyamide fibers containing spun-in screener, and indicates that the gray regions (stippled areas) — resulting from absorption of ultraviolet light by the screener — are concentrated in the core region of the fibers and substantially absent near the fiber surface. (In FIGS. 4 and 5, stippling is again employed to portray grayness, not particles of screener, since at these magnifications, the screener lumps are usually too small to be resolved.) Unfortunately, however, these UV photomicrographs are useful primarily only as qualitative indications of screener concentration gradients from fiber core to skin, since UV diffraction effects have so far made quantitative measurement of local screener concentration near the fiber surface unreliable. In any event, these data strongly suggest that the fibers of the present invention containing microdispersed screener have the screener uniformly distributed throughout the fiber cross-section, which is much preferred to the aromatic polyamide fibers containing spun-in screener which appear to exhibit a critical screener deficiency at the fiber surface. Similar cross-section observations on aromatic polyamide fibers containing dyed-in UV screener indicate undesirable localized concentrations or lumps of screener occurring in fiber faults and crimp nodes, as contrasted with the preferred uniform screener distribution of the present fibers.

In the present invention, the term "aromatic polyamide" means a synthetic polymeric material of sufficiently high molecular weight to be fiber-forming, and charactrized predominantly by the recurring structural unit

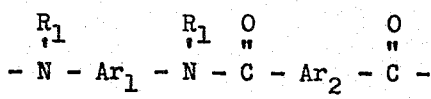

wherein each $R_1$ independently is hydrogen or lower alkyl and wherein $Ar_1$ and $Ar_2$ may be the same or different and may be an unsubstituted divalent aromatic radical or a substituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, nitro, lower carbalkoxy, or other groups which do not form a polyamide during polymeriztion. Preparation of these polymers is disclosed in U.S. Pat. No. 3,094,511. Also comprehended by the term aromatic polyamides are the ordered copolymers, such as are disclosed in U.S. Pat. No. 3,232,910, as well as copolyamides wherein up to about 15% of $Ar_1$ and/or $Ar_2$ may be replaced with nonaromatic chain-linking divalent organic groups, e.g., hexamethylene, cyclohexyl, etc. A preferred aromatic polyamide is polymetaphenylene isophthalamide.

As used herein, the term "UV screener" means a material which absorbs electromagnetic radiation strongly in the wavelength region 340 to 390 millimicrons and which dissipates the absorbed energy without harm to itself or the polymer substrate. Preferably the screener should absorb at least 50% of the incident radiation (e.g., sunlight), averaged over this wavelength region, at a concentration of no more than 50 micrograms per centimeter$^2$ of the material. Since the aromatic polyamide fibers themselves absorb very strongly at wavelenghs shorter than 340 millimicrons, it is immaterial whether the UV screener also absorbs at these shorter wavelengths or not. Although the UV screener may also exhibit some absorption at wavelengths longer than 390 millimicrons (i.e., in the visible wavelength region), such materials will be colored, and are therefore less preferred. Accordingly, for the present purposes, UV screeners are restricted to those materials whose major absorption occurs at wavelengths shorter than 390 millimicrons. Several species of UV screeners operable in the present invention includes substituted benzotriazoles (e.g., Tinuvins 327, 328, HE-139 and P from Ciba-Geigy), substituted bezophenones (e.g., Uvinuls D-49, D-50, 400 and 410 from General Aniline & Film), substituted triazines (e.g., UV-800 from American Cyanamid), etc. A preferred UV screener is 2(2'-hydroxy-3',5'-di-t-butylphenyl)-5-chlorobenzotriazole.

The term "effective amount" as applied to the concentration of UV screener in the fiber means a quantity of screener such that the sample performs at least 1.5X as well as the screener-free fiber. For purposes of this comparision test, the samples are exposed to UV-containing radiation in a Xenon Weather-Ometer, model 60-W, manufactured by Atlas Electric Devices, Co., Chicago, Illinois, following the procedure described in AATCC Method 16E-1964. The ratio of exposure times (sample with screener/sample without screener) required for equal fractional loss in tensile properties, or for equal increments of yellowing or to a given color break for dyed samples, is determined. (The required screener-free reference fiber may be either a portion of fiber from the same spin which has never had screener added, or else may be prepared by solvent-extracting the screener from a portion of the screener-containing fiber sample). For example, when tensile properties are chosen as the comparison criterion, the ratio of exposure times required for, say, the tenacities to fall to, e.g., 50% of their initial values may be determined. When "yellowing" is to be the criterion, the "yellownenss" is measured by determining the $b$ value (modified Adams color coordinates) as a function of exposure time, employing the technique of Glasser & Troy JOSA, Volume 42, page 652 (1952), and the ratio of exposure times required for a given change in $b$ value, e.g., three units for each sample, is determined. Where "color break" is to be the criterion (in the case of dyed samples) the ratio of exposure times required for equal color break (color break being numerically identified with the corresponding step on the Geometric Grey Scale, cf. AATCC Method 16) is determined. When the ratio determined by any one of these tests exceeds 1.5, the screener-containing sample contains an effective amount of screener. Since in general, aromatic polyamide fibers containing at least two weight percent UV screener exceed the 1.5X ratio requirement, and further, since quantities of screener in excess of 6 weight percent not only provide proportionably less UV protection per increment of screener but also frequently (and undesirably) exhibit small "chunks" of excess screener loosely affixed to the fiber surface (even though observation of such surface chunks alone is not to be taken as evidence for lack of "microdipersed" screener distribution within the fiber), the preferred range of screener content is from 2 to 6% by weight.

In the following examples which serve to illustrate the present invention all percentages are by weight unless otherwise specified.

EXAMPLE I

Fiber Preparation

Fibers are prepared from a filtered solution consisting of 18.5%, based on the weight of the solution, of poly(metaphenylene isophthalamide) in N,N-dimethylacetamide (DMAc) that contains 45% calcium chloride based on the weight of the polymer. The polymer has an inherent viscosity of 1.60 as measured on a 0.5% solution in DMAc/4% LiCl at 25°C. The spinning solution is heated to 133°–140°C. and extruded at 0.57 g./min./hole through multi-hole spinnerets, each hole 0.006 inch (150 microns) in diameter and 0.012 inch (300 microns) long, into heated spinning cells. Each cell has 5 heated zones with temperatures from top to bottom of 320°, 300°, 250°, 200°, and 160°C., and a flow of 395°C. inert gas at bout 3.67 pounds/hr. (1.67 kgm./hr.). The fibers are converged at a guide at the bottom of each cell where they are flooded with an aqueous solution containing 7–10% DMAc and 5–7% $CaCl_2$. Fibers from several adjacent cells are combined to give a large bundle of fibers, referred to as a "tow", each filament being about 12 dpf as spun.

The wet tow is fed at 78 ypm. (71 meters/min.) to be extracted and drawn in aqueous baths contained in a ten-tank apparatus. Total draw ratio is 4.2X, and individual bath concentrations, temperatures and draw ratios are shown in Table I. Finish is applied to the tow and the fibers are crimped in a steam stuffer-box crimper. The crimped, never-dried fibers ar stored wet in a sealed container.

TABLE I

WASH DRAW MACHINE SETTINGS

| Tank No. | Draw Ratio (X) | % DMAC | % $CaCl_2$ | Temperature, °C. |
|---|---|---|---|---|
| 1 | 2.55 | 28 | 9 | 82 |
| 2 | 1.41 | 28 | 9 | 82 |
| 3 | 1.13 | 20 | 7 | 82 |
| 4 | 1.01 | 15 | 5 | 90 |
| 5 | 1.01 | 10 | 3 | 90 |
| 6 | 1.01 | — | — | 90 |
| 7 | 1.01 | — | — | 95 |
| 8 | 1.01 | — | — | 95 |
| 9 | 1.01 | — | — | 95 |
| 10 | 1.01 | — | — | 98 |

Screener Addition

The never-dried tow (approximately 50/50 fiber/water) is loaded into the basket of a stock dyer to about five-sixths its maximum capacity. It is important that the tow be well packed. A metal lid is then laid over the top of the cake and held fast with collars and a ratchet. The stock dyer is filled with water and the bath circulated on a 3/3 minute inside-outside/outside-inside cycle. 3%, based on dry fiber weight, of an emulsifier, Witco Chemical Company's "Emcol" P10–59B, an isopropyl amine dodecyl benzene sulfonate, is dispersed in water by vigorous agitation to give a 10% solution and added to the stock dyer and circulated 10 minutes. 5%, based on dry fiber, of UV Screener, 5 chloro-2(2'-hydroxy-3',5'-di-t-butyl phenyl)benzotriazole (Ciba-Geigy's "Tinuvin" 327) is now added as a 10% slurry prepared by sandgrinding a mixture of 100 parts "Tinuvin" 327, 900 parts water and 3 parts "Emcol" P10–59B to reduce 90% of the Tinuvin 327 to 1–2μ particle size. This mixture is now circulated at 70°–80°F. (21°–27°C.) for 2 hours. During this time, much of the Emcol P10–59B and almost all of the Tinuvin 327 are deposited on the fibers. The ratchet and collars are removed and the flow cycle changed to outside-inside only. This allows a significant portion of the circulation volume to bypass the fiber cake and reduce the flow rate through it. The bath temperature is raised to the boil at 1°/min. and held for 3 hours. During this time a portion of the Tinuvin 327 and Emcol P10–59B penetrate the fiber, while some of the material forms a gel around the filaments. Excess water is squeezed out of the fiber/gel which is then transferred to a belt dryer. During drying at a temperature of 280°–290°F. (138°–143°C.) for about 25 minutes, the Tinuvin 327 further penetrates and permeates the fibers and is deposited in microdiepersed form at a concentration of 4.5%. These fibers, dyed with various cationic dyes, exhibit approximately 2X the UV light stability of similarly dyed screener-free fibers.

EXAMPLE II

This example illustrates increasing degrees of UV protection achieved with progressively higher levels of UV screener concentration.

A very fine aqueous dispersion of Tinuvin 327 is prepared by first dissolving a weighed quantity of this UV screener in 10 ml. of methylene chloride. This solution is then poured slowly into a solution of 0.3 g. of Emcol P10–59 dissolved in 100 ml. of water which is being agitated in a blender. Stirring speed is then increased and continued until substantially all the methylene chloride has evaporated, thereby producing a very fine aqueous dispersion of the screener.

Separate 20 g. portions (containing about 10 g. of fiber) of the wet never-dried tow of Example I are individually treated with such dispersions containing various quantities of screener, as indicated in Table II. The samples are held at room temperature for one hour with stirring, diluted with 100 ml. water and then gradually heated to the boiling point and held at that temperature for one additional hour. The fibers are next rinsed with water, dried at 220°F. (104.5°C.), then scoured in a boiling aqueous detergent solution containing 1% Duponol D (a fatty alcohol sulfate from Du Pont) and 1% TSPP (tetrasodium pyrophosphate) and finally dried. The screener concentrations retained in the scoured fibers are listed in Table II. The screener is present in microdispersed form.

Figure 6:
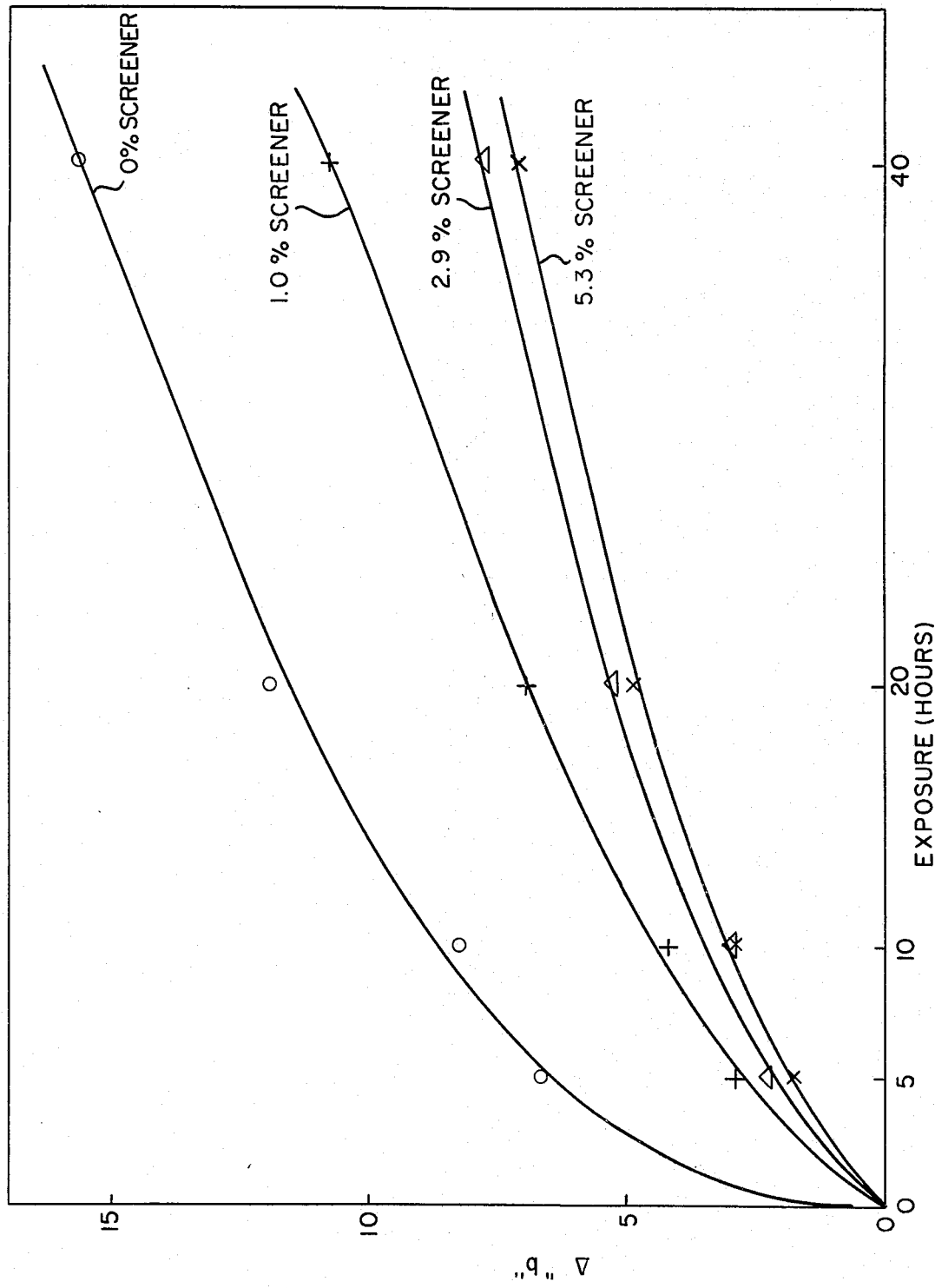
FIG. 6 is a graph showing degradation (yellowing) for various fibers as a function of UV exposure.

These treated fibers are made into pads and put on cards and all samples simultaneously exposed to UV radiation in a Xenon Weather-Ometer. After various exposure periods, the discoloration (yellowing) of the samples is monitored by measuring the $b$ values, reported in Table II. The values indicate that this particular screener contributes some initial yellowness to the fibers, but does inhibit additional yellowing on UV exposure. The change in $b$ value from its zero exposure value, i.e., $\Delta b$, for each sample is plotted versus exposure time in FIG. 6. The data indicate that for a fixed increment in yellowing, say $\Delta b$ equal 3, these screener-containing fibers are protected for well over 1.5X the exposure time of the screener-free fibers, i.e., they contain an effective amount of screener, and that the degree of protection increases with increasing screener content.

Although the above method of applying screener to the never-dried fibers is preferred, satisfactory products also having microdispersed screener may alternatively be obtained by padding a screener dispersion onto the never-dried fibers followed either by a several minutes exposure to steam or simply by heating and drying the padded fibers at temperatures up to about 280°F. (138°C.).

in the form of lumps or chunks larger than 0.01 micron in size. Another fiber sample containing approximately 4% microdispersed Tinuvin 327 is prepared as in Example II. These two fiber samples, plus a screener-free sample, are first dyed with Calcozine Acrylic Blue HP at 205°F. (96°C.) in a 1% (based on fiber) aqueous solution also containing as a mixed carrier 20 g./l. acetanilide plus 30 g./l. Chemocarrier KD-5W (product of Tanatex Chemical Corp., Lyndhurst, N.J.) and then exposed to UV irradiation in the Xenon Weather-Ometer. At 80 houts the dye on the screener-free sample is completely destroyed, while at 40 hours its color

TABLE II

| Sample | Screener in Dispersion | % "Tinuvin" 327 in Scoured Fiber | Exp. hrs. | "b" Values | | | | |
|---|---|---|---|---|---|---|---|---|
| | | | | 0 | 5 | 10 | 20 | 40 |
| 1 | None | None | | 5.7 | 12.4 | 14.0 | 17.7 | 21.4 |
| 2 | .125 g. | 1.0% | | 7.4 | 10.3 | 11.6 | 14.4 | 18.2 |
| 3 | 0.50 g. | 2.9% | | 8.0 | 10.3 | 11.0 | 13.3 | 15.8 |
| 4* | 0.90 g. | 5.3% | | 8.0 | 9.8 | 11.0 | 12.9 | 15.1 |

* Used sand ground dispersed "Tinuvin" 327

EXAMPLE III

This example illustrates comparative performance of fibers containing microdispersed screener and dyed-in screener.

A portion of fibrous tow as prepared in Example I is dried for 0.5 hour at 140°C. Screener is added to these fibers by a "dyeing process" by placing 20 g. of these fibers in a beaker containing an aqueous bath consisting of 2 g. of dispersed UV screener (Tinuvin 327) 2 g. of a carrier (Monsanto's Santicizer 8, a mixture of ortho- and para-N-ethyl toluene sulfonamides), 0.6 g. Emcol P10-59 and 200 ml. of water. The temperature of the bath is raised to 100°C. for 60 minutes, after which the bath is cooled and the fibers removed and scoured with 1% Duponol G. The resulting dyed-in screener content of the fibers is 3.0%, however, microscopic examination of the fibers indicates that the screener is not microdispersed, but rather is concentrated in fiber faults and crimp nodes.

For comparative purposes, a sample of fibers containing 3.6% of the same screener in microdispersed form is prepared in the same way using never-dried fibers. The resistance of these fibers to yellowing on UV exposure is determined as in Example II. The resulting data given in Table III indicate that the microdispersed screener samples of the present invention exhibit markedly greater resistance to yellowing compared to the dyed-in screener samples, then can be accounted for by their only slightly higher screener content.

break is judged to be 2–3. (The color break scale runs from 1–5, with smaller numbers denoting more severe discoloration). The fibers containing 3.6% spun-in screener are approximately two-fold better in that they show a 2–3 color break at 80 hours exposure. The fibers of the present invention containing approximately 4% microdispersed screener show only a 3–4 color break at 80 hours, and are accordingly judged to be about three-fold better than the screener-free sample, and about 1.5-fold better than the spun-in sample containing approximately equivalent amount of screener.

TABLE IV

| Sample | Screener Product | Work-to-Break (gpd X % elongation) | | | |
|---|---|---|---|---|---|
| | | Exp. hrs. 0 | 40 | 80 | 160 |
| 1 | 0 | 1.10 | 0.19 | — | — |
| 2 | 3.3% | 1.29 | 0.39 | 0.10 | 0.02 |
| 3 | 4.8% | 0.85 | 0.56 | 0.24 | 0.02 |

EXAMPLE V

This example illustrates use of an alternative UV screener, 2,2'-dihydroxy-4,4'-dimethoxybenzophenone (Uvinul D-49, product of General Aniline and Film). The UV absorption spectrum of a 1 cm. path length of a solution comprising 0.01 gm. Uvinul D-49 in 600 ml. of chloroform (equivalent to 16.7 micro-

TABLE III

| Sample | Screener Content | Exp. hrs. | "b" Values | | | |
|---|---|---|---|---|---|---|
| | | | 0 | 10 | 20 | 30 |
| No screener | 0 | | 5.8 | 12.6 | 16.7 | 18.5 |
| Dyed-in screener | 3.0% | | 5.0 | 12.3 | 15.1 | 17.5 |
| Microdispersed screener | 3.6% | | 6.7 | 8.8 | 11.0 | 12.4 |

EXAMPLE IV

In a comparative experiment similar to Example III, fibers containing 3.6% spun-in Tinuvin 327 are prepared by dissolving screener in the spinning solution prior to extrusion. The screener is present in the fibers grams/cm.$^2$ of screener) is obtained in the wave length region 340–390 millimicrons, and the absorbances at 5 millimicrons increments averaged to yield an average value of 0.83 absorbance units, (i.e., approximately 85% absorption). This intensity of UV absorption at a concentration of only 16.7 micrograms/cm.$^2$ is, of course, well in excess of the minimum required 50% absorption (0.3 absorbance units) at a concentration of 50 micrograms/cm.².

A fine aqueous dispersion of screener is prepared by dissolving 1.25 gms. of Uvinul D-49 in 10 mls. of methylene chloride which solutions is poured into a stirred solution of 0.4 gms. of Emcol P10-59 in 50 mls. of water, and stirring continued until the methylene chloride has evaporated. Twenty mls. of this dispersion is padded onto 20 grams of the never-dried, fibrous tow of Example I (approximately 10 grams fiber), which are subsequently dried at 220°F. (104.5°C.) and then boiled-off in an aqueous detergent solution containing 1% Duponol G (a fatty alcohol sulfate from Du Pont). The resulting fibers contain 3.3% screener in microdispersed form as evidenced by absence of any agglomerates 0.01 micron in size or larger on electron transmission microscope examination. Two additional samples are prepared in analogous fashion containing 4.8% screener and no screener. The work-to-break (integral of the force-elongation curve, determined similar to ASTM method D-2256) measured on single filaments taken from the three samples is determined as a function of UV exposure time, and reported in Table IV. The protection against UV degradation of tensile properties afforded by the microdispersed screener is clearly apparent.

EXAMPLE VI

This example illustrates preparation of fibers containing microdispersed screener from another aromatic polyamide, poly(paraphenylene terephthalamide).

Fibers are prepared from an 8% solution of poly(-paraphenylene terephthalamide), PPD-T, in 100% sulfuric acid. The spinning solution also contains 0.9% Ponsol Khaki 2G and 0.14% Ponsol Brilliant Violet 4RN (based on polymer). The polymer has an inherent viscosity of 2.5 as measured on an 0.5% solution in concentrated sulfuric acid (96% +) at 25°C. At a temperature of 80°C., the solution is pumped through a multihole spinneret, each hole 0.0015 inch (38 microns) in diameter and 0.0015 inch (38 microns) long, into an aqueous bath at 80°C. containing 5-10% sulfuric acid. Extrusion velocity is 40 ypm. (36.6 meters/min.) and the fiber is extracted at 25°-30°C. in five baths. The first three baths contain water, the next sodium carbonate at pH 9 and the final bath water. Draw during extraction is approximately 6%, enough to maintain tension on the fiber during the extraction.

A dispersion of Tinuvin 327 is made up by taking 30 ml. of 9.5% Tinuvin 327 dispersion (sandground), diluting to 500 ml. with water and adding 1.5 g. Emcol P10-59. This dispersion, containing 2.5 g. Tinuvin 327, is placed in a Launderometer can, and to the dispersion is added 396 g. (dry weight 50 g.) of wet, never-dried PPD-T fiber prepared as described above. The can is sealed, the dispersion circulated for 1 hour at room temperature (Lauderometer) and then heated at the boil for 3 hours. The fiber is then removed from the can and dried at 250°F. (121°C.) in a Moisture Teller for 1 hour. The treated fiber is boiled off with 1% Merpol HCS (surface active agent, product of Du Pont) and dried at 220°F. (104.5°C.). Analysis indicates that the fibers contain 2.1% Tinuvin 327, which is present in microdispersed form as evidenced by absence of any agglomerates 0.01 micron in size or larger on electron transmission microscope examination. Staple pads are prepared and exposed in the Xenometer. Color break for the screener-containing fibers at 40 hours exposure is approximately equal to that for otherwise identical, but screener-free fibers, at 20 hours.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. An aromatic polyamide fiber containing an effective amount of an ultraviolet light screener in which the screener is microdispersed in the fiber in a discrete form such that any agglomerate thereof is less than 0.01 micron in diameter, and in which the screener absorbs electromagnetic radiation in the 340 to 390 millimicron wavelength region.

2. The fiber of claim 1 wherein the amount of ultraviolet light screener present is between about 2 and about 6 percent by weight.

3. The fiber of claim 1 wherein the ultraviolet light screener abosrbs at least 50% of the incident radition, averaged over the 340 to 390 millimicron wavelength range, at a concentration of no more than 50 micrograms per square centimeter of the screener.

4. The fiber of claim 2 wherein the ultraviolet light screener absorbs at least 50% of the incident radiation, averaged over the 340 to 390 millimicron wavelength range, at a concentration of no more than 50 micrograms per square centimeter of the screener.

5. The fiber of claim 3 wherein the ultraviolet light screener is a substituted benzotriazole, a substituted benzophenone or a substituted triazine.

6. The fiber of claim 5 wherein the ultraviolet light screener is 2(2'-hydroxy-3',5'-di-t-butyl phenyl)-5-chlorobenzotriazole.

7. The fiber of claim 6 wherein the aromatic polyamide is polymetaphenylene isophthalamide.

* * * * *